United States Patent
Eckert

(10) Patent No.: US 9,665,438 B2
(45) Date of Patent: May 30, 2017

(54) SYSTEM AND METHOD FOR THE PRODUCTION OF JOB LEVEL PRE-PROCESSED BACKUP OF CRITICAL DATA AND/OR DATASETS IN A MAINFRAME COMPUTING ENVIRONMENT

(71) Applicant: Teracloud SA, Luxemburg (LU)

(72) Inventor: Paul J. Eckert, Newtown Square, PA (US)

(73) Assignee: TERACLOUD SA, Luxembourg (LU)

( * ) Notice: Subject to any disclaimer, the term of this patent is extended or adjusted under 35 U.S.C. 154(b) by 279 days.

(21) Appl. No.: 14/716,034

(22) Filed: May 19, 2015

(65) Prior Publication Data

US 2015/0347236 A1 Dec. 3, 2015

Related U.S. Application Data

(60) Provisional application No. 62/005,117, filed on May 30, 2014.

(51) Int. Cl.
| | |
|---|---|
| G06F 12/00 | (2006.01) |
| G06F 13/00 | (2006.01) |
| G06F 11/14 | (2006.01) |
| G06F 11/20 | (2006.01) |

(52) U.S. Cl.
CPC ...... *G06F 11/1451* (2013.01); *G06F 11/1435* (2013.01); *G06F 11/1461* (2013.01); *G06F 11/1464* (2013.01); *G06F 11/1438* (2013.01); *G06F 11/2094* (2013.01)

(58) Field of Classification Search
CPC ............. G06F 11/1446; G06F 11/1448; G06F 11/1451; G06F 11/1458; G06F 11/1461; G06F 11/1466; G06F 11/2056; G06F 11/2064; G06F 11/2082; G06F 11/2089
See application file for complete search history.

(56) References Cited

U.S. PATENT DOCUMENTS

| | | | |
|---|---|---|---|
| 6,279,117 B1 | 8/2001 | Takeda | |
| 7,558,928 B1 | 7/2009 | DeVos | |
| 2011/0161299 A1 | 6/2011 | Prahlad et al. | |
| 2013/0018946 A1* | 1/2013 | Brown | G06F 11/1451 709/203 |
| 2015/0177813 A1* | 6/2015 | Bailey | G06F 1/3234 713/320 |
| 2015/0347260 A1* | 12/2015 | Eckert | G06F 11/34 718/100 |

OTHER PUBLICATIONS

International Search Report and Written Opinion issued in related International Application No. PCT/IB2015/000758, dated Oct. 1, 2015.
International Preliminary Report on Patentability and Written Opinion for International Application No. PCT/IB2015/000758, issued Dec. 6, 2016, 12 pages.

* cited by examiner

*Primary Examiner* — Sean D Rossiter
(74) *Attorney, Agent, or Firm* — RatnerPrestia

(57) ABSTRACT

A system determines the datasets to be utilized by a batch job prior to commencement of the batch job. A snapshot of each dataset to be utilized is created. The created snapshot is replicated and a record related to the snapshot is created in a backup table. In the event of disruption of the batch job during processing, each replicated snapshot can be restored and the batch job restarted.

19 Claims, 5 Drawing Sheets

SYSTEM AND METHOD FOR THE PRODUCTION OF JOB LEVEL PRE-PROCESSED BACKUP OF CRITICAL DATA AND/OR DATASETS IN A MAINFRAME COMPUTING ENVIRONMENT

TECHNICAL FIELD

The present examples relate to techniques and processes for determining which datasets will be utilized by a particular batch job and creating a snapshot of those determined datasets.

BACKGROUND

Mainframe computing is a computing platform used today by the largest companies in the world. A mainframe often processes many workloads such as accounts receivable, general ledger, payroll and a variety of applications needed for specific business requirements. These workloads are commonly referred to as applications or jobs.

A mainframe is a complex environment consisting of databases and datasets (i.e., files). These data typically reside on a direct access storage device (DASD) or disk drive. In addition to DASD, mainframe applications also rely on one or more tape drives/devices to store portions of these data. Tape drive(s) can be the primary repository of vital information within a mainframe application. Tape today can be either physical tape which must be mounted on hardware to be read or virtual tape which is disk-based storage emulating physical tape.

Mainframe computers process information in one of two modes of operation, online or batch. An online system, for example, provides an interactive application interface for interaction by customers and employees. In contrast, a batch system, for example, involves non-interactive processing of an application (e.g., generating statements) in which the application is started and runs without intervention until it completes. Both batch and online applications exist and run in predetermined cycles to automate data processing for an organization.

Replication is the process of creating an exact copy of a particular storage system, either DASD or tape. In replicated batch environments, multiple devices (e.g., primary storage system and replicated storage system) are generally kept to a certain consistency point. That is, the data on the primary storage system is timed at the same exact point on the replicated storage system. A consistency group is a collection of storage to be maintained in a consistent state (e.g., consistency group A includes volume A and tape drive 1, consistency group B includes volumes B and C).

While replication occurs at a point in time, data processing typically doesn't stop at that point in time during the replication. Furthermore, replication, especially when tape-based storage systems are involved, requires processing time, even if nominal, to create the copy. Thus, the replicated copy, by its very nature, may already be outdated at the point in time of the replication.

In addition, a particular mainframe application may utilize various datasets stored across various primary storage systems that may include both DASD and tape. Replication is performed, for example, for each individual storage system. As such, replication of each of the various datasets utilized by the particular mainframe application may occur at different times.

SUMMARY

What is needed, therefore, is a technique and process for determining which datasets will be utilized by a particular batch job and creating a snapshot of those determined datasets. Prior to commencement of a batch job, datasets required by the batch job are determined, for example, based on an inventory file. A snapshot of each determined dataset is created and the snapshots are replicated offsite via replicated storage. Once the snapshots are created and replicated, the batch job commences.

An example of an article of manufacture described in detail below includes a non-transitory machine readable medium and a program embodied in the medium. In the article of manufacture example, execution of the program by a processor supports functions, including functions to create a collection of critical datasets related to a job and, for each critical dataset in the collection of critical datasets, create a current snapshot backup of the critical dataset. The job, in the example, includes references to programs to be executed by the processor as a batch process. The collection of critical datasets is created, in the example, based upon a trigger in the job.

An example of a method described in detail below includes the steps of creating, by a process executing on a processor and based upon a trigger in a job, a collection of critical datasets related to the job and, for each critical dataset in the collection of critical datasets, create a current snapshot backup of the critical dataset. In this method example, the job includes references to programs to be executed by the processor as a batch process.

A system example described in detail below includes a processor, a storage device accessible by the processor and a program in the storage device. In the system example, execution of the program by the processor configures the system to implement functions, including functions to create a collection of critical datasets related to a job and, for each critical dataset in the collection of critical datasets, create a current snapshot backup of the critical dataset. The job, in this system example, includes references to programs to be executed by the processor as a batch process.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
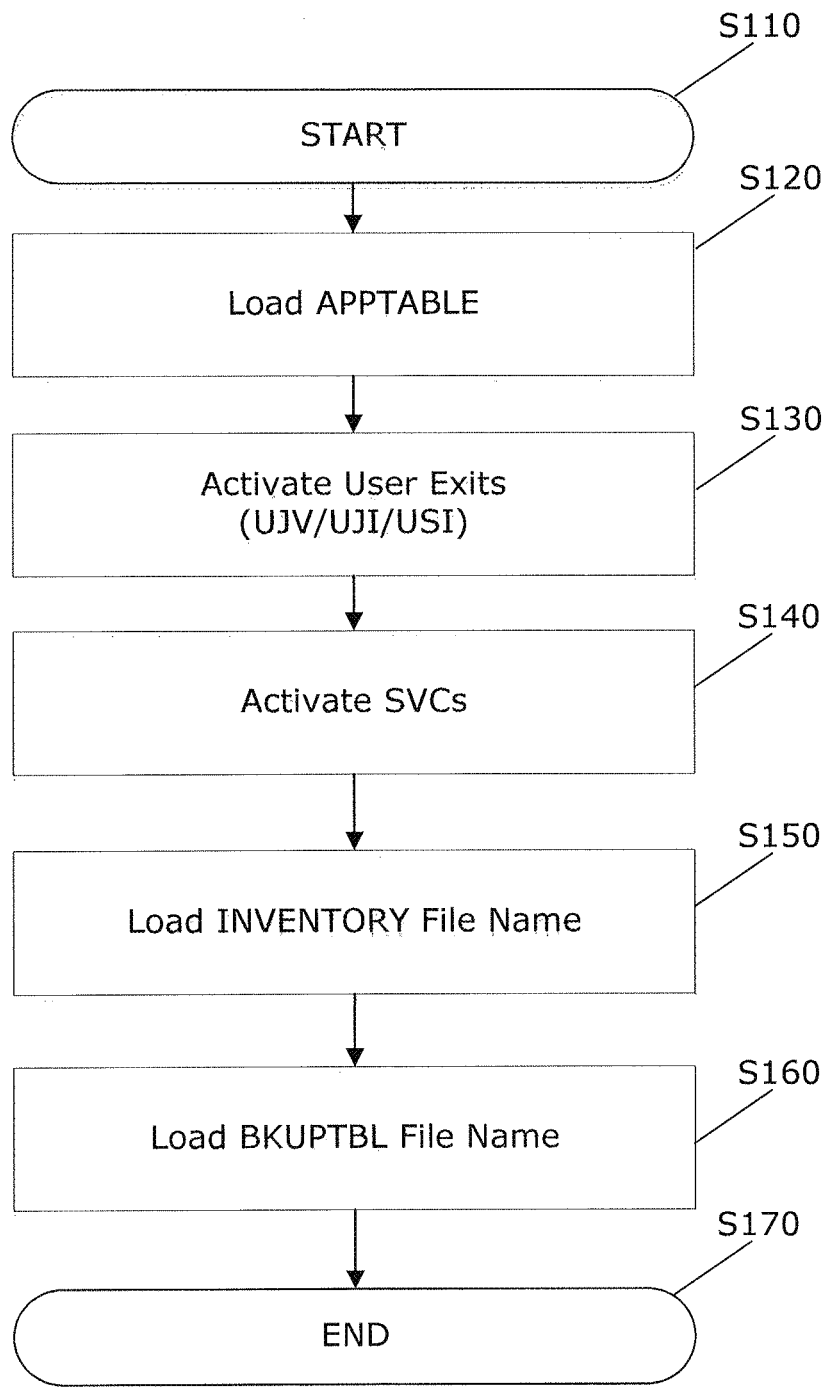
FIG. 1 is a process flow diagram of an example of a process involved in identifying vital jobs and critical datasets.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In an example mainframe environment, a job is a collection of programs, or job steps, instructing a processor to perform particular functions. When a job is represented as a sequence of job control language (JCL) statements, each job step is defined by an EXEC statement referencing a program and supported by data definition (DD) statements which represent the datasets to be processed. While a job includes one or more commands, or job steps, a single job step may, in turn, represent a procedure, program and/or other process that includes one or more steps, functions, and/or other components that each perform some form of processing. Thus, a job step is a single entry within a job, but is not limited to performing a single step of processing. A job is also often referred to as a batch job, because the collection of JCL is processed in batch by the processor. In this mainframe environment, jobs are continually being processed. These jobs regularly reference datasets (e.g., files) as part of their processing. As such, at any given point in time, some number of jobs may have some number of datasets opened and may be processing data related to those opened datasets. The opened datasets, however, may not have a recent backup available. Furthermore, in the event of a disaster or other interruption of processing within the mainframe environment, it may be difficult to determine which job step(s) the various jobs were processing and which datasets were being processed. As such, without a recent backup of datasets opened by a particular interrupted job, the job cannot simply be restarted after the interruption.

Several of the examples improve the ability to restart a job after an interruption by creating a snapshot backup of critical or updated files referenced by the job prior to the files being referenced. In one example, an additional job step or process is inserted at the beginning of a job. The additional job step or process, in this example, creates a collection of critical or updated files referenced by the job and, for each critical or updated file, generates a snapshot backup of the critical or updated file. Alternatively, or in addition, the additional job step may be added to each existing job step or some subset of job steps within the job. In this alternate example, the additional job step is limited to creating a collection of critical or updated files referenced only by the corresponding step(s) within the job. While inserting the additional processing (e.g., creation of critical or updated files collection) as an additional job step is one approach, another approach involves utilizing, for example, one or more exits and/or other hooks to enable the additional processing. In this way, in the event of a disaster or other interruption of processing within a mainframe environment, critical or updated files referenced by a job can be restored from the snapshot backup and the job can be restarted, either from the beginning or from a particular job step.

Reference now is made in detail to the examples illustrated in the accompanying drawings and discussed below.

FIG. 1 illustrates an example of a process involved in preparing an environment so that vital or production jobs and critical or updated datasets may be identified. Although the example of FIG. 1 is depicted as a stand-alone process, such process may be utilized by or otherwise integrated into one or more other processes. For example, another process directed to tracking activity related to vital jobs may integrate the process of FIG. 1 as a sub-process or a series of sub-steps in order that the activity tracking process can utilize one or more exits or supervisor calls as part of tracking vital job related activity. An "exit" is a hook or other link within a routine provided by or within an operating system of a mainframe environment. The exit within the routine allows an end-user, such as an individual, group and/or organization, to write additional commands to be processed as part of that portion of the routine. Alternatively, or in addition, other techniques, such as a supervisor call (SVC), a system authorization facility (SAF), or an otherwise non-documented hook, may also be employed to enable end-user provided additional commands to be processed. Every possible exit or hook, however, is not always activated, or otherwise available for use, within a mainframe environment. Thus, the process of FIG. 1 provides an opportunity for an end-user to prepare vital or production jobs to include additional processing.

In step S110, the process is initiated. In step S120, the process loads, for example, a dataset containing a list of jobs considered to be vital. In one example, the dataset containing the list of vital jobs is an APPTABLE. A job is considered to be vital or production, for example, if the job references datasets considered to be critical or updated and/or is otherwise identified as vital or production (e.g., a user, group or organization indicates the job is vital or production). A referenced dataset is critical, for example, if the dataset provides input to the job during processing of the job. A referenced dataset is updated, for example, if the job will add, delete, revise or otherwise manipulate data within the dataset such that, after execution of the job, the updated dataset contains different data. For clarity, the various examples refer to "critical or updated datasets" for which additional processing will be performed. Such reference, however, is intended to convey an identification of only critical files, only updated files or critical and updated files. Furthermore, such reference is intended to convey that the additional processing will be performed for only critical files, only updated files or critical and updated files.

In step S130, exit functionality is activated. For example, user job verification (UJV), user job initiation (UJI), and/or user step initiation (USI) exit functionality is activated such that UJV/UJI/USI exits will be processed as part of job execution (e.g., UJV when job verification occurs, UJI when a job initiates, USI when a step within the job initiates). As described above, an exit is a hook or other link within a routine. Every possible exit, however, is not always activated within a mainframe environment. As such, in order to utilize a particular exit for executing end-user written commands, the particular exit needs to be activated within the mainframe environment. In this example, UJV/UJI/USI exits are activated in step S130 so that additional processing related to job verification can be performed for each executed job. An example of particular processing to be performed as part of a UJV/UJI/USI exit is described in greater detail below in relation to FIGS. 2 and 2A.

In step 140, additional SVC front end functionality is activated. In a mainframe environment, an SVC represents a request from a job or other processing routine for the operating system to perform a hardware function or hardware interrupt. For example, when a job requests a dataset open, the open request triggers an SVC that prompts the OS to perform, via one or more hardware interrupts, the hardware function of opening the dataset. Similar to the UJV/UJI/USI triggers for user exits described above, an SVC represents an opportunity for additional user-written processing, commonly referred to as a front end, to be performed. That is, an SVC front end is a hook that represents additional processing to be performed when the particular SVC is triggered. However, as with user exits, SVC front ends are not always activated within a mainframe environment. Thus, any additional SVC front end functionality needs to be activated so that those SVC front ends may be utilized. The processing depicted in the examples of FIGS. 2 and 2A may additionally or alternatively be performed as part of an SVC front end.

In step 150, the process loads a file name for a dataset containing a list of critical or updated datasets that are to be backed-up prior to or as part of a job or job step. This file name, in one example, is referred to as the Inventory file name. The process, in step S160, loads a file name for a dataset containing a list of datasets that have been backed-up. In one example, this file name is referred to as the BKUPTBL file name. The file names in step S150 and S160 (e.g., Inventory, BKUPTBL) are loaded into a common storage area. In step S170, the process ends.

Figure 2:
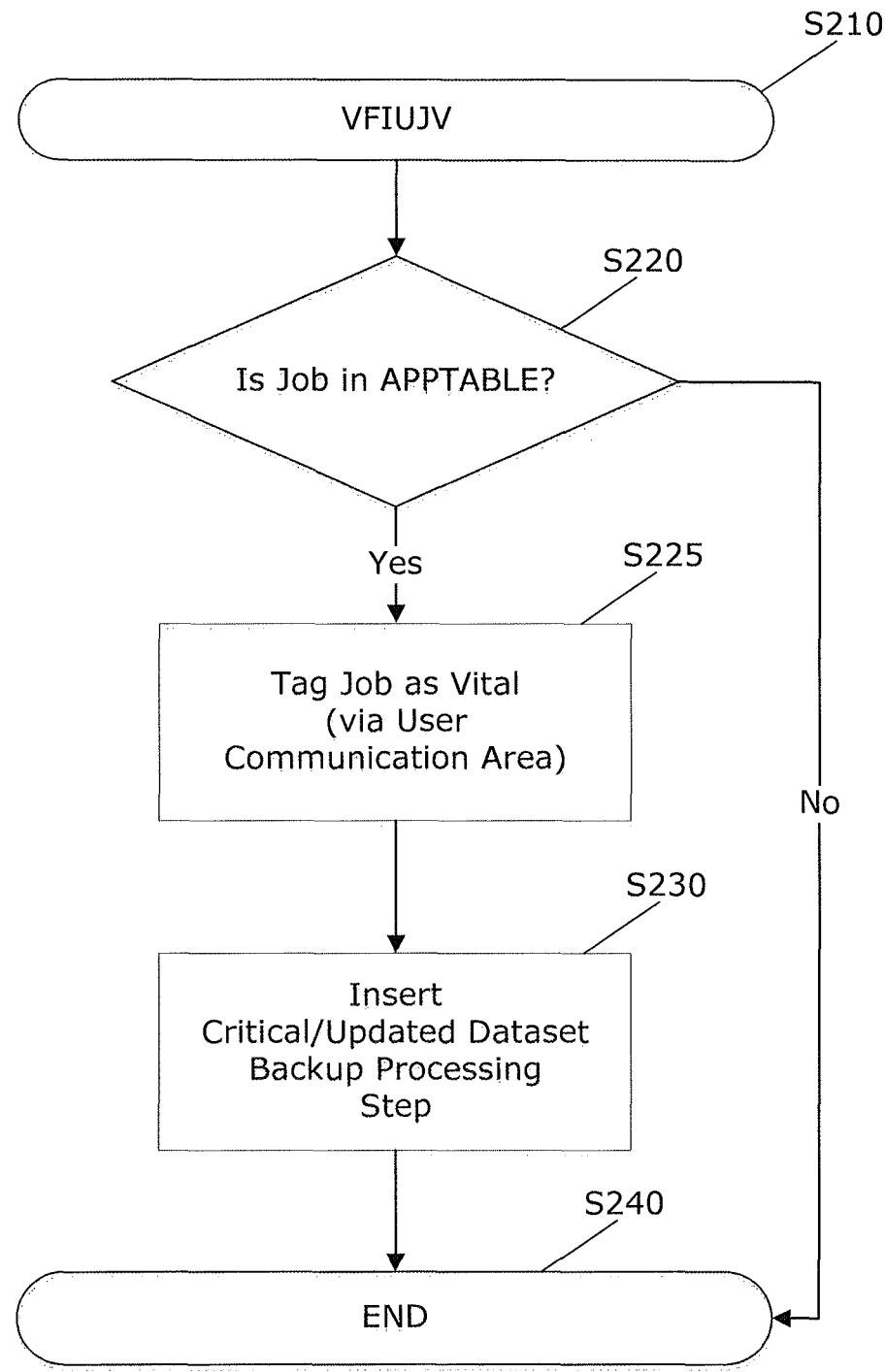
FIG. 2 is a process flow diagram of an example of a process for identifying a vital job and enabling additional processing.

FIG. 2 illustrates an example of a process for identifying a vital job and enabling additional processing. Job verification is performed, for example, by a job execution spooler (e.g., JES2, JES3). As described above, if the UJV exit is activated, additional processing may be performed as part of job verification. Vital file identifier UJV (VFIUJV) is, for example, an end-user written set of commands to be executed as part of the UJV exit. In step S210, for example, VFIUJV starts when a job is to be executed and the UJV exit is activated. In step S220, VFIUJV determines, for example, whether the job to be executed is included in the dataset containing the list of vital jobs (e.g., APPTABLE). If the job is not in the vital jobs dataset (e.g., APPTABLE), VFIUJV ends in step S240. If the job is in the vital jobs dataset, VFIUJV proceeds to step S225.

In step S225, VFIUJV tags the job as a vital job. In one example, VFIUJV utilizes the user communication area of the job in order to tag the job. The user communication area is an area within the control blocks of the running job. The tag is, for example, an entry included within the user communication that indicates the related job is vital. While tagging a job as vital may provide for improved processing by other processes, such as the activity tracking process referenced above, subsequent processing described herein (e.g., critical or updated dataset backup) is not dependent on the existence of such tag. As such, step S225 is an optional step.

VFIUJV, in step S230, inserts an additional job step or process into the job. In one example, the additional job step is a process to create a collection of critical or updated datasets referenced by the job and, for each critical or updated dataset used by the job, generate a snapshot backup of the critical or updated dataset. This additional job step is described in greater detail below. After the additional job step is inserted into the job in step S230, the process proceeds to step S240 and ends.

Although the system is described as using VFIUJV to dynamically insert the additional job step into the job, it is contemplated that, when the sequence of jobs to be performed is contained in a job control language (JCL) file, the JCL file may be preprocessed to insert the additional job step into each vital job that is both in the JCL file and the APPTABLE.

Figure 2A:
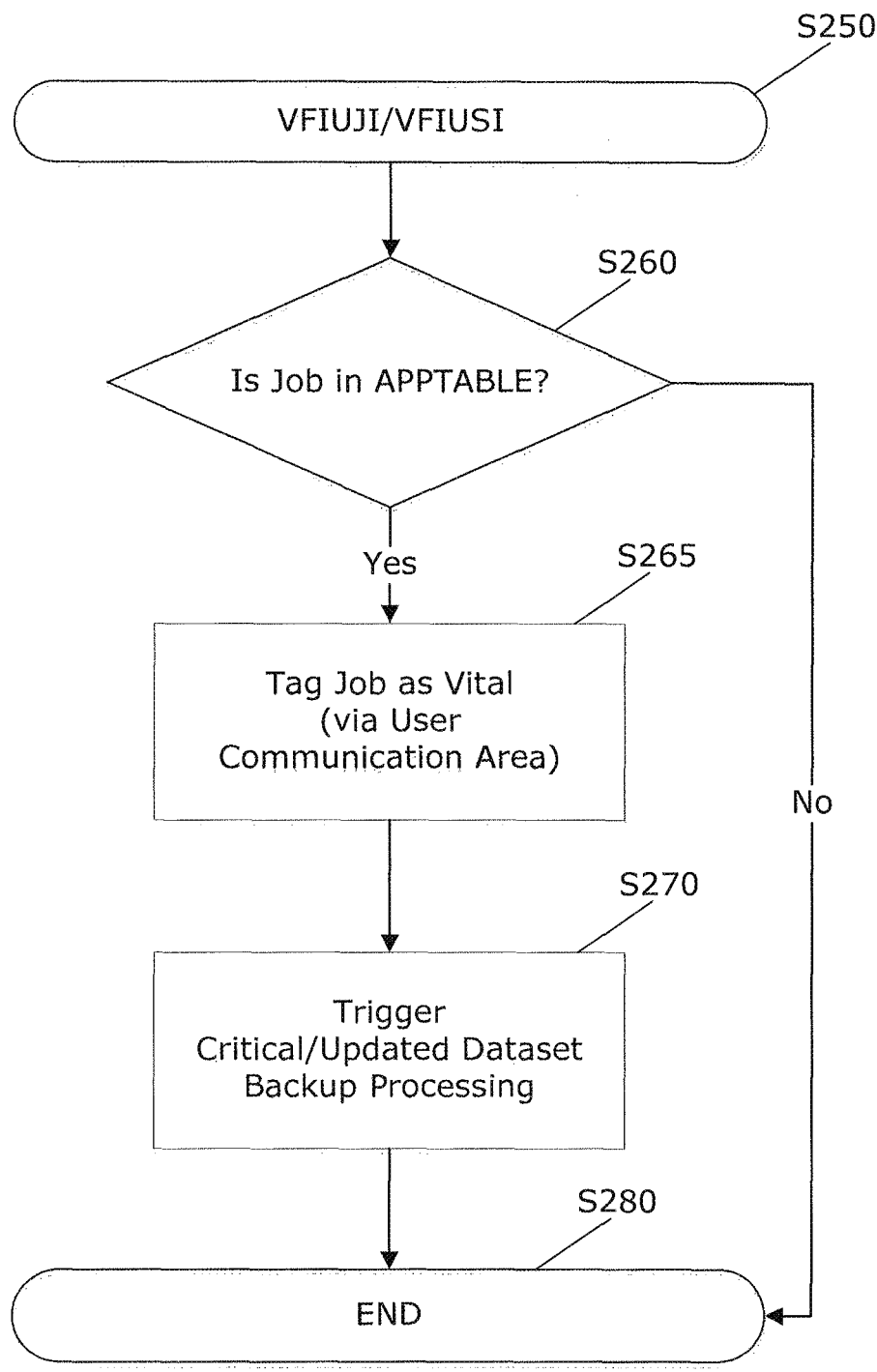
FIG. 2A is a process flow diagram of an example of an alternative process for identifying a vital job and enabling additional processing.

In the previous example, VFIUJV is utilized as a UJV exit to insert an additional job step into a job to be executed. That is, VFIUJV, as a UJV exit, inserts an additional line depicting a command into the job. After job verification is complete and job execution begins, the additional job step, as described in greater detail below, is then processed as part of job execution. A job, however, is limited to a total of 255 job steps. As such, inserting an additional job step may not be possible or may not be the optimal approach to enable additional processing. FIG. 2A illustrates an example of an alternative process to identify a vital job and enable additional processing. In this alternate example, UJI exit or USI exit functionality may be utilized to ensure the additional job step processing occurs, without inserting an additional job step into the job.

VFIUJI/VFIUSI starts, in step S250, when a job is initiated and/or when a job step within a job is initiated. That is, the process depicted in FIG. 2A may be performed more than once during execution of a single job (e.g., at job initiation and at initiation of each job step within the job). As with VFIUJV above, VFIUJI/UFIUSI, in step S260, determines whether the job is included in the dataset containing the list of vital jobs (e.g., APPTABLE). If the job is not in the vital jobs dataset, VFIUJI/VFIUSI ends in step S280. If the job is in the vital jobs dataset, VFIUJI/VFIUSI proceeds to step S265.

Similar to step S225 of the VFIUJV process, VFIUJI/VFIUSI, in step S265, tags the job as vital. As with step S225 of FIG. 2, step S265 is also optional.

Unlike step S230 of the VFIUJV process, VFIUJI/VFIUSI, in step S270, triggers the critical or updated dataset backup processing to occur. That is, while the VFIUJV process inserts an additional job step(s) into the job before the job actually starts, VFIUJI/VFIUSI waits until the appropriate time (e.g., job initiation and/or step initiation) and triggers the additional processing (e.g., critical or updated dataset backup) at that time. Once the additional processing is complete, VFIUJI/VFIUSI ends in step S280.

Figure 3:
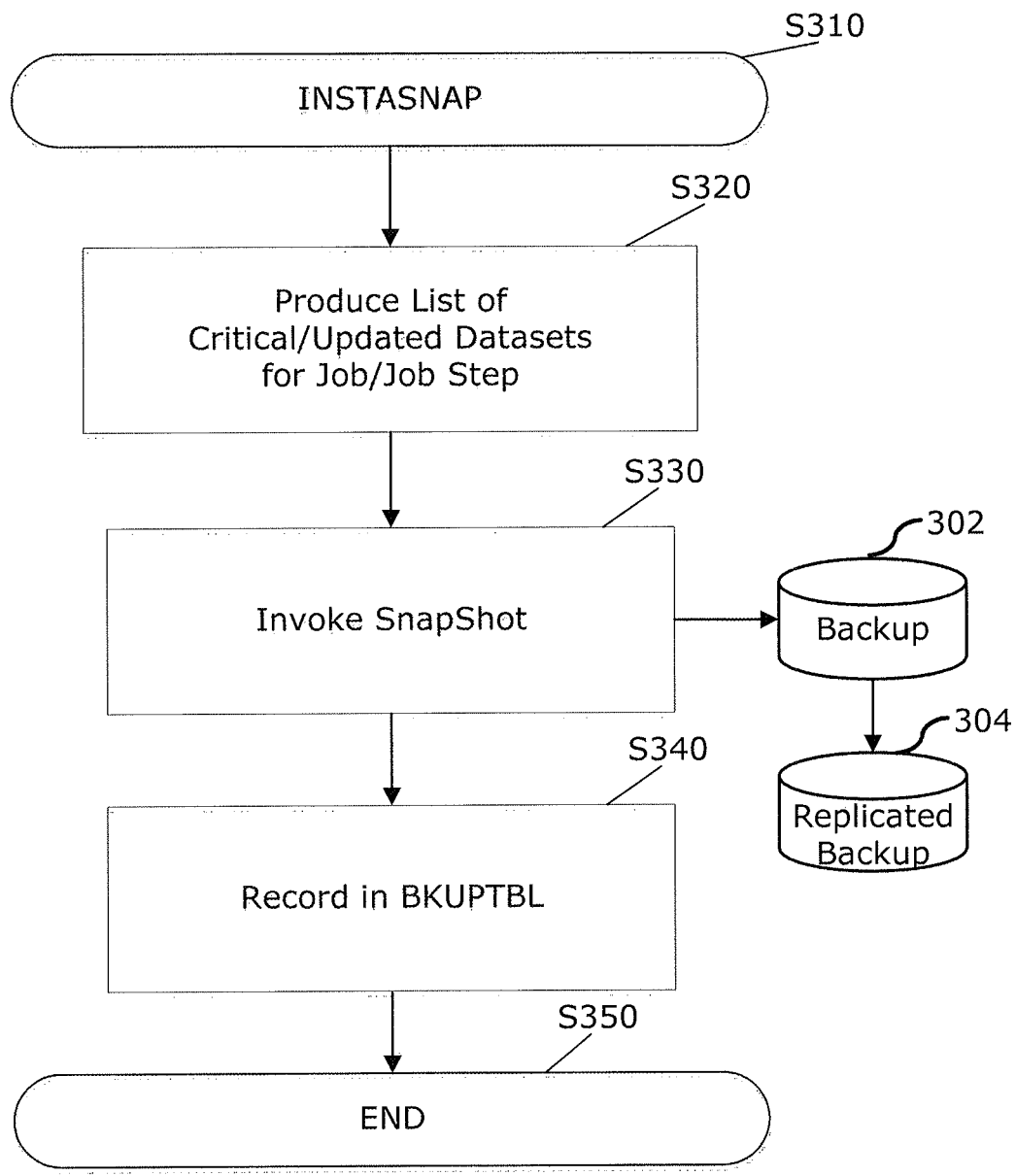
FIG. 3 is a process flow diagram of an example of a process for generating a snapshot backup of critical files related to a job.

FIG. 3 illustrates an example of a process for generating a snapshot backup of critical files related to a job. The process, for example, is added as an additional job step in a job by a UJV exit and/or additional processing performed by a UJI/USI exit, as described above in relation to FIGS. 2 and 2A. In step S310, the process begins and, in step S320, the process produces a list of critical or updated datasets for the job/job step. A critical dataset is a dataset that provides input to the job/job step during processing of the job/job step. An updated dataset is a dataset for which the job/job step will add, delete, revise or otherwise manipulate data within the dataset such that, after execution of the job/job step, the updated dataset contains different data.

The list of critical or updated datasets for the job is produced, for example, by reviewing an inventory dataset (e.g., Inventory) that includes a list of all datasets referenced by the job/job step and a status or type of each referenced dataset. Such inventory dataset, for example, is created based on historical analysis of prior execution of the job. If the status or type, as indicated in the inventory dataset, is critical or updated, the referenced critical or updated dataset is included in the produced list. Although referencing an inventory dataset is one example of identifying critical datasets, it is not the only example. Similar information, for example, may be included in a vital jobs dataset (e.g., APPTABLE), based on the historical analysis, and/or may be determined based on a current analysis of the job to be executed performed by the process (e.g., scan of the job).

In step S330, a snapshot backup is created, for example, for each critical or updated dataset identified in step S320. A snapshot is a copy of a dataset made by the storage system within which the dataset is currently stored. A snapshot in computer storage is analogous to a picture taken with a camera in photography. In one example, the snapshot is performed by the hardware (e.g., DASD or tape system) providing the storage system in accordance with specifications and/or processes defined by the storage system hardware manufacturer(s). Hence, step S330, in this example, invokes or otherwise initiates a snapshot process that is completed by the storage system hardware, such as backup 302. In order to ensure redundancy and high-availability, the snapshot backup, in a further example, is also replicated to a secondary storage system, such as replicated backup 304.

Replication is performed, for example, in one of two different ways and this replication impacts completion of the snapshot backup. In a first example, replication is performed synchronously. For synchronous replication, data is replicated between the primary storage system, such as backup 302, and the secondary storage system, such as replicated backup 304, as the snapshot is being performed and the snapshot is not complete until replication is complete.

In a second example, replication is performed asynchronously. Asynchronous replication allows the snapshot to complete once the copy of the dataset is created within the primary storage system, such as backup 302. After the snapshot is created, then replication is initiated between the primary storage system, such as backup 302, and the secondary storage system, such as replicated backup 304. In the first example, the process cannot proceed to step S340 until after both the snapshot backup and replication are complete. In the second example, the process proceeds to step S340 after the snapshot backup is created while replication is still completing.

In step S340, a record corresponding to each created snapshot backup is created, for example, in a dataset containing a list of all datasets that have been backed up (e.g., BKUPTBL). In one example, the record is created in the backup dataset directly. In another example, an alternate process, such as the activity tracking process referenced above, is notified of the backup and the alternate process creates the backup record. Each corresponding record includes, for example, the name of the dataset backed up, the time the dataset was backed up, the location at which the dataset was backed up, and whether the backed up dataset was replicated, as well as other information related to the backed up dataset. In step S340, the additional step or processing ends and the job continues job processing.

In this way, vital jobs are identified and an additional job step (or additional processing based on a user exit) to create a snapshot backup of each critical or updated file referenced by the job is added to the job. In the event of a disaster or other interruption of processing within the mainframe environment, any job being processed at that time can be restarted after restoring any referenced critical or updated files for which a snapshot backup was created.

Figure 4:
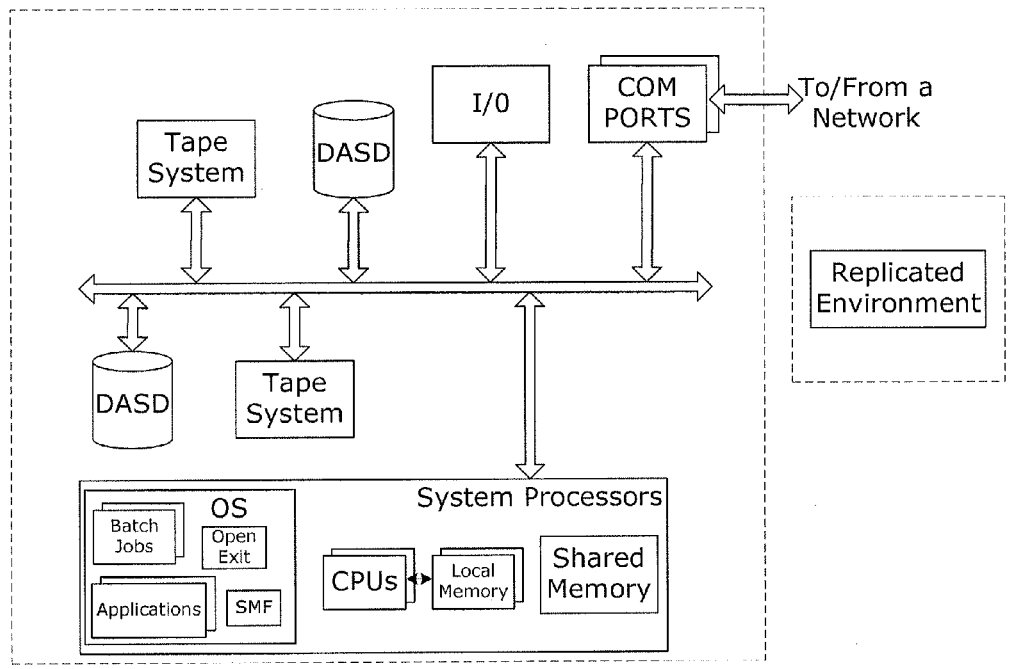
FIG. 4 is a simplified functional block diagram of a computer that may be configured as a server and/or mainframe.
Figure 5:
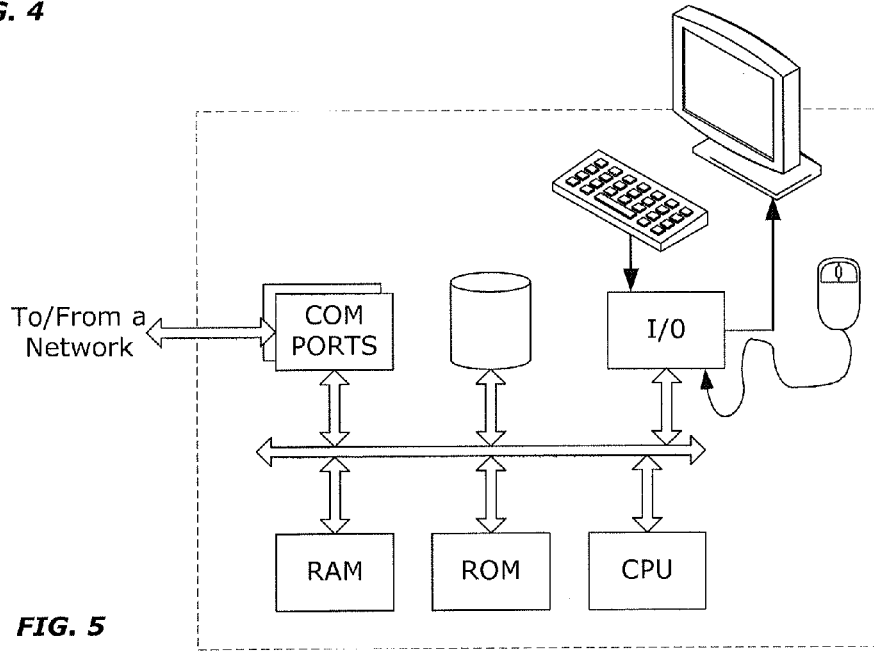
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server and/or mainframe.

FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A mainframe, for example, includes a data communication interface for packet data communication and an input/output (I/O) controller. The I/O controller manages communication to various I/O elements and storage facilities. Storage facilities include one or more direct access storage devices (DASD) and/or one or more tape systems. Such storage facilities provide storage for data, jobs for managing batch processing and applications. The mainframe includes an internal communication bus providing a channel of communication between the communications ports, the I/O controller, and one or more system processors. Each system processor includes one or more central processing units (CPUs) and local memory corresponding to each CPU, as well as shared memory available to any CPU. An operating system (OS) executed by the system processors manages the various jobs and applications currently running to perform appropriate processing. The OS also provides a system management facility (SMF) and open exit points for managing the operation of the mainframe and the various jobs and applications currently running. The hardware elements, operating systems, jobs and applications of such mainframes are conventional in nature. Of course, the mainframe functions may be implemented in a distributed fashion on a number of similar platforms, to distribute the processing load, and/or replicated across one or more similar platforms, to provide redundancy for the processing. As such, FIG. 4 also depicts a replicated environment. Although details of the replicated environment are not depicted, such replicated environment typically contains similar components as already described in relation to the primary mainframe of FIG. 4.

A computer type user terminal device, such as a PC, similarly includes a data communication interface CPU, main memory and one or more mass storage devices for storing user data and the various executable programs. The various types of user terminal devices will also include various user input and output elements. A computer, for example, may include a keyboard and a cursor control/selection device such as a mouse, trackball, or touchpad; and a display for visual outputs. The hardware elements, operating systems and programming languages of such user terminal devices also are conventional in nature.

Hence, aspects of the methods for recording the time each step within a job executing within a mainframe computing environment begins and ends outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through a global information network (e.g. the Internet®) or various other telecommunication networks. Such communications, for example, may enable loading of the software from one computer or processor into another, for example, from a management server or host computer such as proxy server 306 into the mainframe platform that will execute the various jobs. Thus, another type of media that may bear the software elements includes optical, electrical and electromagnetic waves, such as used across physical interfaces between local devices, through wired and optical landline networks and over various air-links. As used herein, unless restricted to non-transitory, tangible "storage" media, terms such as computer or machine "readable medium" refer to any medium that participates in providing instructions to a processor for execution.

Non-volatile storage media include, for example, optical or magnetic disks, such as any of the storage devices in any computer(s) or the like, such as may be used to hold datasets and programs for enterprise applications. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge or any other medium from which a computer can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising: a processor; a storage device accessible by the processor; and a backup management program in the storage device, wherein execution of the backup management program by the processor configures the system to implement functions, including functions to: create, based upon a trigger in a job, a collection of datasets related to the job, the job comprising: one or more commands to be executed by the processor, each command including a job step within the job; and one or more dataset references, each dataset reference including a dataset name of a dataset to be accessed by a related one of the one or more commands; and for each dataset in the collection of datasets: create a snapshot backup of the respective dataset; and record, in a backup activity dataset, an indication of the created snapshot backup; and a user job verification program, wherein execution of the user job verification program by the processor configures the system to implement functions, including functions to: determine, upon verification of the job, whether the job is vital; and upon a determination that the job is vital, add an additional job step to the job, the additional job step being the trigger; and the implemented function to create the collection of datasets comprises functions, including functions to: for each dataset reference in the job: determine whether the dataset referenced by the respective dataset reference is to be included in the collection of datasets; and upon a determination that the respective dataset is to be included in the collection, add the respective dataset to the collection.

2. The system of claim 1, wherein the included function to determine whether the dataset referenced by the respective dataset reference is to be included in the collection includes functions to: determine whether the respective dataset is to be updated by the job; and upon a determination that the respective dataset is to be updated by the job, determine that the respective dataset is to be included in the collection.

3. The system of claim 2, wherein the function to determine whether the respective dataset is to be updated by the job includes functions to:
 compare the respective dataset name included in the respective dataset reference to dataset names contained in an inventory dataset; and
 upon a match of the respective dataset name to one of the dataset names contained in the inventory dataset, determine that the respective dataset is to be updated by the job.

4. The system of claim 1, wherein further execution of the user job verification program by the processor configures the system to implement a function to: tag the job as vital.

5. The system of claim 1, further comprising a user job initiation program, wherein:
 execution of the user job initiation program by the processor configures the system to implement functions, including functions to:
 determine, upon initiation of the job, whether the job is vital; and
 upon a determination that the job is vital, signal the backup management program, the signal being the trigger; and
 the implemented function to create the collection of datasets comprises functions, including functions to:
 for each dataset reference in the job:
 determine whether the dataset referenced by the respective dataset reference is to be included in the collection of datasets; and
 upon a determination that the respective dataset is to be included in the collection, add the respective dataset to the collection.

6. The system of claim 5, wherein the included function to determine whether the dataset referenced by the respective dataset reference is to be included in the collection includes functions to:
  determine whether the respective dataset is to be updated by the job; and
  upon a determination that the respective dataset is to be updated by the job, determine that the respective dataset is to be included in the collection.

7. The system of claim 6, wherein the function to determine whether the respective dataset is to be updated by the job includes functions to:
  compare the respective dataset name included in the respective dataset reference to dataset names contained in an inventory dataset; and
  upon a match of the respective dataset name to one of the dataset names contained in the inventory dataset, determine that the respective dataset is to be updated by the job.

8. The system of claim 5, wherein further execution of the user job initiation program by the processor configures the system to implement a function to:
  tag the job as vital.

9. The system of claim 1, further comprising a user job step initiation program, wherein:
  execution of the user job step initiation program by the processor configures the system to implement functions, including functions to:
    determine, upon initiation of a job step within the job, whether the job is vital; and
    upon a determination that the job is vital, signal the backup management program, the signal being the trigger; and
  the implemented function to create the collection of datasets comprises functions, including functions to:
    for each dataset reference included in the respective job step:
      determine whether the dataset referenced by the respective dataset reference is to be included in the collection of datasets; and
      upon a determination that the respective dataset is to be included in the collection, add the respective dataset to the collection.

10. The system of claim 9, wherein the included function to determine whether the dataset referenced by the respective dataset reference is to be included in the collection includes functions to:
  determine whether the respective dataset is to be updated by the respective job step; and
  upon a determination that the respective dataset is to be updated by the respective job step, determine that the respective dataset is to be included in the collection.

11. The system of claim 10, wherein the function to determine whether the respective dataset is to be updated by the respective job step includes functions to:
  compare the respective dataset name included in the respective dataset reference to dataset names contained in an inventory dataset; and
  upon a match of the respective dataset name to one of the dataset names contained in the inventory dataset, determine that the respective dataset is to be updated by the job.

12. The system of claim 9, wherein further execution of the user job step initiation program by the processor configures the system to implement a function to:
  tag the job as vital.

13. The system of claim 1, wherein the function to create a snapshot backup further includes the functions to:
  determine whether an existing backup of the respective dataset is current; and
  upon a determination that the existing backup of the respective dataset is not current, create a current snapshot backup of the respective dataset.

14. A method, comprising: creating, by a backup management process executing on a processor and based upon a trigger in a job, a collection of datasets related to the job, the job comprising: one or more commands to be executed by the processor as a batch process, each command including a job step within the job; and one or more dataset references, each dataset reference including a dataset name of a dataset to be accessed by a related one of the one or more commands; and for each dataset in the collection of datasets: creating a snapshot backup of the respective dataset; and recording an indication of the created snapshot backup in a backup record dataset; and executing, by the processor, a user job verification program, wherein execution of the user job verification program includes: determining, upon verification of the job, whether the job is vital; and upon a determination that the job is vital, adding an additional job step to the job, the additional job step being the trigger; and wherein the implemented function to create the collection of datasets includes for each dataset reference in the job: determining whether the dataset referenced by the respective dataset reference is to be included in the collection of datasets; and upon a determination that the respective dataset is to be included in the collection, adding the respective dataset to the collection.

15. The method of claim 14, further comprising: for each dataset reference in the job: determining whether the dataset referenced by the respective dataset reference is to be updated by the job by comparing the respective dataset name included in the respective dataset reference to dataset names contained in an inventory dataset; and upon a match of the respective dataset name to one of the dataset names contained in the inventory dataset, determining that the respective dataset is to be updated by the job and adding the respective dataset to the collection.

16. The method of claim 14, further comprising:
  determining, upon job initiation and by a user job initiation process executing on the processor, whether the job is vital; and
  upon determining that the job is vital, sending a signal to the backup management process, wherein:
    the signal is the trigger; and
    the step of creating the collection of datasets related to the job further comprises:
      for each dataset reference in the job:
        determining whether the dataset referenced by the respective dataset reference is to be updated by the job by comparing the respective dataset name included in the respective dataset reference to dataset names contained in an inventory dataset; and
        upon a match of the respective dataset name to one of the dataset names contained in the inventory dataset, determining that the respective dataset is to be updated by the job and adding the respective dataset to the collection.

17. The method of claim 14, further comprising:
  determining, upon job step initiation and by a user job step initiation process executing on the processor, whether the job is vital; and upon determining that the job is vital, sending a signal to the backup management process, wherein:
the signal is the trigger; and
the step of creating the collection of datasets related to the job further comprises:
for each dataset reference included in the respective job step:
determining whether the dataset referenced by the respective dataset reference is to be updated by the job step by comparing the respective dataset name included in the respective dataset reference to dataset names contained in an inventory dataset; and
upon a match of the respective dataset name to one of the dataset names contained in the inventory dataset, determining that the respective dataset is to be updated by the job and adding the respective dataset to the collection.

18. The method of claim 14, wherein the step of creating the snapshot backup of the respective dataset further comprises:
determining whether an existing backup of the respective dataset is current; and
upon a determination that the existing backup of the respective dataset is not current, creating a current snapshot backup of the respective dataset.

19. An article of manufacture, comprising: a non-transitory machine readable medium; and a program embodied in the medium, wherein execution of the program by a processor supports functions, including functions to: create, based upon a trigger in a job, a collection of datasets related to the job, the job comprising: one or more commands to be executed by the processor, each command including a job step within the job; and one or more dataset references, each dataset reference including a dataset name of a dataset to be accessed by a related one of the one or more commands; and for each dataset in the collection of datasets: create a snapshot backup of the respective dataset; and record, in a backup activity dataset, an indication of the created snapshot backup; and a user job verification program, wherein execution of the user job verification program configures the system to implement functions, including functions to: determine, upon verification of the job, whether the job is vital; and upon a determination that the job is vital, add an additional job step to the job, the additional job step being the trigger; and the implemented function to create the collection of datasets comprises functions, including functions to: for each dataset reference in the job: determine whether the dataset referenced by the respective dataset reference is to be included in the collection of datasets; and upon a determination that the respective dataset is to be included in the collection, add the respective dataset to the collection.

* * * * *